(12) United States Patent
Gehring et al.

(10) Patent No.: US 10,479,006 B2
(45) Date of Patent: Nov. 19, 2019

(54) INJECTION MOLDING AND ASSEMBLY APPARATUS AND METHOD OF MOLDING AND ASSEMBLING A PLURALITY OF TWO DIFFERENT MOLDED PARTS

(71) Applicant: Otto Männer Innovation GmbH, Bahlingen (DE)

(72) Inventors: Alexander Gehring, Bötzingen (DE); Ulrich Kaczmarek, Emmendingen (DE)

(73) Assignee: OTTO MÄNNER INNOVATION GMBH, Bahlingen (DE)

( * ) Notice: Subject to any disclaimer, the term of this patent is extended or adjusted under 35 U.S.C. 154(b) by 672 days.

(21) Appl. No.: 15/112,361

(22) PCT Filed: Oct. 16, 2014

(86) PCT No.: PCT/EP2014/072284
§ 371 (c)(1),
(2) Date: Jul. 18, 2016

(87) PCT Pub. No.: WO2015/055799
PCT Pub. Date: Apr. 23, 2015

(65) Prior Publication Data
US 2016/0361849 A1    Dec. 15, 2016

(30) Foreign Application Priority Data
Oct. 16, 2013    (EP) ..................... 13189007

(51) Int. Cl.
*B29C 45/00*    (2006.01)
*B29C 45/17*    (2006.01)
(Continued)

(52) U.S. Cl.
CPC ........ *B29C 45/006* (2013.01); *B29C 45/0416* (2013.01); *B29C 45/0433* (2013.01);
(Continued)

(58) Field of Classification Search
CPC .......... B29C 45/006; B29C 2045/2685; B29C 2045/2683; Y10T 29/49616;
(Continued)

(56) References Cited

U.S. PATENT DOCUMENTS 3,319,300 A    5/1967    Hehl
4,444,711 A    4/1984    Schad
(Continued)

FOREIGN PATENT DOCUMENTS

| CH | 705721 | 5/2013 |
| CH | 705805 | 5/2013 |

(Continued)

OTHER PUBLICATIONS

English Translation Hirata JP-2000238090-A (Year: 2000).*

*Primary Examiner* — Jason L Vaughan
*Assistant Examiner* — Amanda Kreiling
(74) *Attorney, Agent, or Firm* — McAndrews, Held & Malloy, Ltd.

(57) ABSTRACT

An injection molding apparatus may include a first mold plate and a second mold plate. The second mold plate may be movable outside an injection molding station defined by these mold plates. The second mold plate may carry parts of type A' and parts of type B' molded at the same time within the injection molding station. A transferring mechanism may carry the second mold plate to removing and assembling stations where molded parts A' are first removed from the second mold plate and next parts A' are positioned relative molded parts B', where the molded parts B' and A' are finally assembled. Simultaneously other parts A' and B' may be molded at the injection molding station using an additional and identical second mold plate. Depending on the application, molded parts A' and B' may be made of the same or different materials.

15 Claims, 11 Drawing Sheets

(51) Int. Cl.
 *B29C 45/04* (2006.01)
 *B29C 45/26* (2006.01)
(52) U.S. Cl.
 CPC .......... *B29C 45/1756* (2013.01); *B29C 45/26* (2013.01); *B29C 2045/2683* (2013.01); *B29C 2045/2685* (2013.01)
(58) Field of Classification Search
 CPC ......... Y10T 29/49659; Y10T 29/49762; Y10T 29/49785; Y10T 29/49805; Y10T 29/49826; Y10T 29/49835; Y10T 29/53; Y10T 29/53261; Y10T 29/534; Y10T 29/53417
 See application file for complete search history.

(56) References Cited

U.S. PATENT DOCUMENTS

| | | |
|---|---|---|
| 4,460,534 A | 7/1984 | Boehm et al. |
| 4,734,023 A | 3/1988 | Nesch et al. |
| 5,090,889 A | 2/1992 | Döber et al. |
| 5,221,507 A | 6/1993 | Beck et al. |
| 5,221,538 A | 6/1993 | Gasami et al. |
| 5,338,592 A | 8/1994 | Ohsumi et al. |
| 6,042,364 A | 3/2000 | Nishida |
| 6,299,816 B1 | 10/2001 | Takemoto et al. |
| 6,428,737 B1 * | 8/2002 | Collette .............. B29C 45/1625 264/255 |
| 7,627,950 B2 | 12/2009 | Deronet |
| 8,025,828 B2 | 9/2011 | Armbruster |
| 8,470,228 B2 | 6/2013 | Armbruster |
| 2008/0113056 A1 | 5/2008 | Schnurr |
| 2014/0134366 A1 | 5/2014 | Armbruster |

FOREIGN PATENT DOCUMENTS

| | | |
|---|---|---|
| DE | 3811465 | 10/1989 |
| DE | 102011102449 | 11/2012 |
| EP | 0671251 | 9/1995 |
| EP | 1058612 | 9/2004 |
| EP | 2258531 | 10/2011 |
| EP | 2512772 | 10/2013 |
| JP | S5595544 | 7/1980 |
| JP | 2595135 | 3/1997 |
| WO | 9835808 | 8/1998 |
| WO | 2009098056 | 8/2009 |

* cited by examiner

INJECTION MOLDING AND ASSEMBLY APPARATUS AND METHOD OF MOLDING AND ASSEMBLING A PLURALITY OF TWO DIFFERENT MOLDED PARTS

The present application is filed pursuant to 35 U.S.C. § 371 as a U.S. National Phase application of International Patent Application No. PCT/EP2014/072284, which was filed Oct. 16, 2014. International Patent Application No. PCT/EP2014/072284 claims priority to European Patent Application No. EP 13189007.1, filed Oct. 16, 2013. The entire text of the aforementioned applications are incorporated herein by reference in their entirety.

The invention relates to an injection molding and assembly apparatus and to a method of molding and assembling a plurality of two different molded parts.

Molded parts which have to be assembled are often manufactured on different machines, stored and later assembled in special assembling devices. This requires three machines to be involved in the manufacturing of the assembly.

Further, when manufacturing injection molded parts, melt is injected into a cavity of predetermined shape. During the cooling process, the melt solidifies in irregular time and positions within the injected volume. Therefore the dimensions of the injection molded parts differ from cavity to cavity, even if the tolerances of the dimensions of the cavities are narrow. This issue is in particular important, when molded parts have small dimensions and the parts have to be assembled with another injection molded part. Sometimes, parts are easily to assemble in one orientation and are hard to assemble if they are rotated, even if the dimensions should be the same in both orientations.

Therefore, there is a need for an improved manufacturing of injection molded parts which have to be assembled.

The application proposes an injection molding and assembly apparatus comprising a first injection unit to provide a first molten material and first machine platen and a second machine platen, a first injection molding station defined between the first machine platen and the second machine platen, a first mold plate and a second mold plate, the second mold plate comprising at least a portion of a plurality of first mold cavities of type A and at least a portion of a plurality of mold cavities of type B. The second mold plate is aligned with the first mold plate, and the second mold plate is laterally movable relative to the first mold plate and outside the injection molding station. The plurality of first mold cavities of type A are configured to form a plurality of molded parts of type A'. The plurality of mold cavities of type B are configured to form a plurality of molded parts of type B' that have a different structure relative to the molded parts of type A'. The injection molding and assembly apparatus further comprises a transferring mechanism to carry the second mold plate including the molded parts of type A' and of type B' outside the injection molding station and a first device to remove the molded parts of type A' from the first mold cavities of type A, a second device to position the molded parts of type A' in a predetermined position relative to the molded parts of type B', a removing and coupling device to separate the molded parts of type B' from the second mold plate and to couple the molded parts of type A' and type B' to create an assembly of molded parts of type A' and type B'.

In a further development of the injection molding and assembly apparatus, the plurality of mold cavities of type B is a plurality of second mold cavities of type B.

In a further development, the injection molding and assembly apparatus comprises a second injection unit to inject a second molten material. This enables to manufacture a variety of different molded parts for assembly.

In a further development of the injection molding and assembly apparatus, the first mold plate comprises at least a further portion of the plurality of the mold cavities of type A and at least a further portion of the plurality of mold cavities of type B, so as to complete the mold cavities of type A and the mold cavities of type B. As the mold opens after the molded part has solidified at least to a certain degree and before the second mold plate moves out of the injection station, at least a portion of the cavities can be positioned in the first mold plate.

In a further development of the injection molding and assembly apparatus, the second mold plate comprises the entire mold cavities of type A and the entire mold cavities of type B.

In a further development of the injection molding and assembly apparatus, the structure of the molded parts of type A' and the molded parts of type B' differ in at least one of shape, size, weight, length, smell, depth, origin, look, volume, color, chemical composition.

In a further development of the injection molding and assembly apparatus, the removing and coupling device is configured to couple the molded parts of type A' and the molded parts of type B' in pairs such that a molded part of type A' coming from a specific one of the plurality of the mold cavities of type A is always coupled to a molded part of type B' coming from one and the same of the plurality of the mold cavities of type B.

In a further development of the injection molding and assembly apparatus, the removing and coupling device is provided as an integral device or is provided as two separate devices. An advantageous structure and design of the removing and coupling device depends on the structure and design of the molded parts to assemble to simplify the handling of the parts.

In a further development of the injection molding and assembly apparatus, the molded part of type A' is a component comprising a cavity, and molded part of type B' is a component having a shape which is configured to be introduced into the cavity of molded part of type A'.

The application further proposes an injection molding and assembly apparatus with at least one first mold plate and a second mold plate, which comprises a plurality of mold cavities of type A, configured to form a plurality of molded parts of type A', and a plurality of mold cavities of type B, configured to form a plurality of molded parts of type B' that have a different structure relative to the molded parts of type A'. The apparatus further comprises a transferring mechanism to carry the second mold plate including molded parts of type A' and of type B' to a predetermined position and a first device to remove the molded parts of type A' from the mold cavities of type A and a second device to position the molded parts of type A' in a predetermined position relative to the molded parts of type B'. The apparatus further comprises a removing and coupling device to separate the molded parts of type B' from the second mold plate and to couple the molded parts of type A' and type B' to create an assembly of molded parts of type A' and type B'.

The application further proposes a method of molding and assembling a plurality of two different molded parts, with the following steps:

forming a plurality of molded parts of type A' and a plurality of molded parts of type B' in a first injection molding station by means of a first mold plate and a second mold plate, wherein the second mold plate comprising at least a portion of a plurality of mold cavities of type A and at least a portion of a plurality of mold cavities of type B, wherein the second mold plate is aligned with the first mold plate, and wherein the second mold plate being laterally movable relative to the first mold plate and outside the injection molding station;

carrying the second mold plate including the molded parts of type A' and of type B' outside the injection molding station by means of a transferring mechanism;

removing the molded parts of type A' from the mold cavities of type A by means of a first device;

positioning the molded parts of type A' in a predetermined position relative to the molded parts of type B' by means of a second device;

separating the molded parts of type B' from the second mold plate and coupling the molded parts of type A' and type B' to create an assembly of molded parts of type A' and of type B' by means of a removing and coupling device.

In a further development, the method is accomplished with mold cavities of type A which are first mold cavities of type A and mold cavities of type B which are second mold cavities of type B.

The application proposes a further method of molding and assembling a plurality of two different molded parts, with the following steps:

forming a plurality of molded parts of type A' using a plurality of mold cavities of type A and a plurality of molded parts of type B' using a plurality of mold cavities of type B, wherein the molded parts of type B' have a different structure relative to the molded parts of type A', wherein the mold cavities of type A and of type B are positioned in a first and second mold plate or in the second mold plate;

carrying the second mold plate including the molded parts of type A' and of type B' to a predetermined position;

removing the molded parts of type A' from the mold cavities of type A;

positioning the molded parts of type A' in a predetermined position relative to the molded parts of type B';

separating the molded parts of type B' from the second mold plate and coupling the molded parts of type A' and type B' to create an assembly of molded parts of type A' and type B'.

In a further development, the method is accomplished when the second mold plate is aligned with the first mold plate, and when the second mold plate is laterally movable relative to the first mold plate.

In a further development, the method further comprises the step of coupling the molded parts of type A' and the molded parts of type B' in pairs such that a molded part of type A' coming from a specific one of the plurality of the mold cavities of type A is always coupled to a molded part of type B' coming from one and the same of the plurality of the mold cavities of type B.

In one aspect, the invention relates to an injection molding and assembly apparatus comprising:

a first injection unit to provide a first molten material;
a first machine platen and a second machine platen;
a first injection molding station defined between the first machine platen and the second machine platen;
a first mold plate and
a second mold plate, the second mold plate comprising at least a portion of a plurality of first mold cavities of type A and at least a portion of a plurality of second mold cavities of type B, wherein the second mold plate is aligned with the first mold plate, the second mold plate being laterally movable relative to the first mold plate and outside the injection molding station;

wherein the plurality of first mold cavities of type A are configured to form a plurality of molded parts of type A', and wherein the plurality of second mold cavities of type B are configured to form a plurality of molded parts of type B' that have a different structure relative to the molded parts of type A';

a transferring mechanism to carry the second mold plate including the molded parts of type A' and of type B' outside the injection molding station;

a first device to remove the molded parts of type A' from the first mold cavities of type A;

a second device to position the molded parts of type A' in a predetermined position relative to the molded parts of type B';

a removing and coupling device to separate the molded parts of type B' from the second mold plate and to couple the molded parts of type A' and type B' to create an assembly of molded parts of type A' and type B'.

In a further aspect, the invention relates to an injection molding and assembly apparatus comprising:

a first injection unit to provide a first molten material;
a first machine platen and a second machine platen;
a first injection molding station defined between the first machine platen and the second machine platen;
a first mold plate and
a second mold plate, the second mold plate comprising at least a portion of a plurality of mold cavities of type A and at least a portion of a plurality of mold cavities of type B, wherein the second mold plate is aligned with the first mold plate, the second mold plate being laterally movable relative to the first mold plate and outside the injection molding station;

wherein the plurality of mold cavities of type A are configured to form a plurality of molded parts of type A', and wherein the plurality of mold cavities of type B are configured to form a plurality of molded parts of type B' that have a different structure relative to the molded parts of type A';

a transferring mechanism to carry the second mold plate including the molded parts of type A' and of type B' outside the injection molding station;

a first device to remove the molded parts of type A' from the mold cavities of type A;

a second device to position the molded parts of type A' in a predetermined position relative to the molded parts of type B';

a removing and coupling device to separate the molded parts of type B' from the second mold plate and to couple the molded parts of type A' and type B' to create an assembly of molded parts of type A' and type B'.

In one embodiment, the injection molding and assembly apparatus further includes a second injection unit to inject a second molten material.

In one embodiment, the first mold plate comprising at least a further portion of the plurality of the mold cavities of type A and at least a further portion of the plurality of mold cavities of type B, so as to complete the mold cavities of type A and the mold cavities of type B.

In one embodiment, the second mold plate comprises the entire mold cavities of type A and the entire mold cavities of type B.

In one embodiment, the structure of the molded parts of type A' and the molded parts of type B' differ in at least one of shape, size, weight, length, smell, depth, origin, look, volume, color, chemical composition.

In one embodiment, the removing and coupling device is configured to couple the molded parts of type A' and the molded parts of type B' in pairs such that a molded part of type A' coming from a specific one of the plurality of the mold cavities of type A is always coupled to a molded part of type B' coming from one and the same of the plurality of the mold cavities of type B.

In one embodiment, the removing and coupling device is provided as an integral device or is provided as two separate devices, that is, a separate removing device and a separate coupling device.

In one embodiment, the molded part of type A' is a component comprising a cavity, and molded part of type B' is a component having a shape which is configured to be introduced into the cavity of molded part of type A'.

In one embodiment, the second device is provided as a robot system. In one embodiment, the first device and the removing and coupling device are amongst others configured to eject the molded parts from the corresponding cavities/mold plates.

In a further aspect, the invention relates to a method of molding and assembling a plurality of two different molded parts, the method comprising:
- forming a plurality of molded parts of type A' and a plurality of molded parts of type B' in a first injection molding station by means of a first mold plate and a second mold plate, wherein the second mold plate comprising at least a portion of a plurality of first mold cavities of type A and at least a portion of a plurality of second mold cavities of type B,
- wherein the second mold plate is aligned with the first mold plate, and wherein the second mold plate being laterally movable relative to the first mold plate and outside the injection molding station;
- carrying the second mold plate including the molded parts of type A' and of type B' outside the injection molding station by means of a transferring mechanism;
- removing the molded parts of type A' from the first mold cavities of type A by means of a first device;
- positioning the molded parts of type A' in a predetermined position relative to the molded parts of type B' by means of a second device;
- separating the molded parts of type B' from the second mold plate and coupling the molded parts of type A' and type B' to create an assembly of molded parts of type A' and of type B' by means of a removing and coupling device.

In a further aspect, the invention relates to a method of molding and assembling a plurality of two different molded parts, the method comprising:
- forming a plurality of molded parts of type A' and a plurality of molded parts of type B' in a first injection molding station by means of a first mold plate and a second mold plate, wherein the second mold plate comprising at least a portion of a plurality of mold cavities of type A and at least a portion of a plurality of mold cavities of type B,
- wherein the second mold plate is aligned with the first mold plate, and wherein the second mold plate being laterally movable relative to the first mold plate and outside the injection molding station;
- carrying the second mold plate including the molded parts of type A' and of type B' outside the injection molding station by means of a transferring mechanism;
- removing the molded parts of type A' from the mold cavities of type A by means of a first device;
- positioning the molded parts of type A' in a predetermined position relative to the molded parts of type B' by means of a second device;
- separating the molded parts of type B' from the second mold plate and coupling the molded parts of type A' and type B' to create an assembly of molded parts of type A' and of type B' by means of a removing and coupling device.

In a further aspect, the invention relates to a method of molding and assembling a plurality of two different molded parts, the method comprising:
- forming a plurality of molded parts of type A' using a plurality of mold cavities of type A and a plurality of molded parts of type B' using a plurality of mold cavities of type B, wherein the molded parts of type B' have a different structure relative to the molded parts of type A',
- wherein the mold cavities of type A and of type B are positioned in a first and second mold plate or in the second mold plate;
- wherein the second mold plate is aligned with the first mold plate, and wherein the second mold plate being laterally movable relative to the first mold plate;
- carrying the second mold plate including the molded parts of type A' and of type B' to a predetermined position;
- removing the molded parts of type A' from the mold cavities of type A;
- positioning the molded parts of type A' in a predetermined position relative to the molded parts of type B';
- separating the molded parts of type B' from the second mold plate and coupling the molded parts of type A' and type B' to create an assembly of molded parts of type A' and of type B'.

In one embodiment the method further comprises the step of coupling the molded parts of type A' and the molded parts of type B' in pairs such that a molded part of type A' coming from a specific one of the plurality of the mold cavities of type A is always coupled to a molded part of type B' coming from one and the same of the plurality of the mold cavities of type B.

In a further aspect, the invention relates to an injection molding and assembly apparatus comprising:
- at least a first mold plate and a second mold plate, comprising
- a plurality of mold cavities of type A, configured to form a plurality of molded parts of type A', and
- a plurality of mold cavities of type B, configured to form a plurality of molded parts of type B' that have a different structure relative to the molded parts of type A';
- a transferring mechanism to carry the second mold plate including molded parts of type A' and of type B' to a predetermined position;
- a first device to remove the molded parts of type A' from the mold cavities of type A;
- a second device to position the molded parts of type A' in a predetermined position relative to the molded parts of type B';

a removing and coupling device to separate the molded parts of type B' from the second mold plate and to couple the molded parts of type A' and type B' to create an assembly of molded parts of type A' and type B'.

In a further aspect, the invention relates to a method of molding and assembling a plurality of two different molded parts, the method comprising:

forming a plurality of molded parts of type A' using a plurality of mold cavities of type A and a plurality of molded parts of type B' using a plurality of mold cavities of type B, wherein the molded parts of type B' have a different structure relative to the molded parts of type A', wherein the mold cavities of type A and of type B are positioned in a first and second mold plate or in the second mold plate;

carrying the second mold plate including the molded parts of type A' and of type B' to a predetermined position;

removing the molded parts of type A' from the mold cavities of type A;

positioning the molded parts of type A' in a predetermined position relative to the molded parts of type B';

separating the molded parts of type B' from the second mold plate and coupling the molded parts of type A' and type B' to create an assembly of molded parts of type A' and type B', It should be noted that all embodiments of the present invention relate to all aspects of the present invention. In particular, one or more of the injection unit(s) of the apparatus comprise a hot runner system.

Further advantages, features and applications of the present invention will become apparent from the following description taken in conjunction with the figures.

Figure 1:
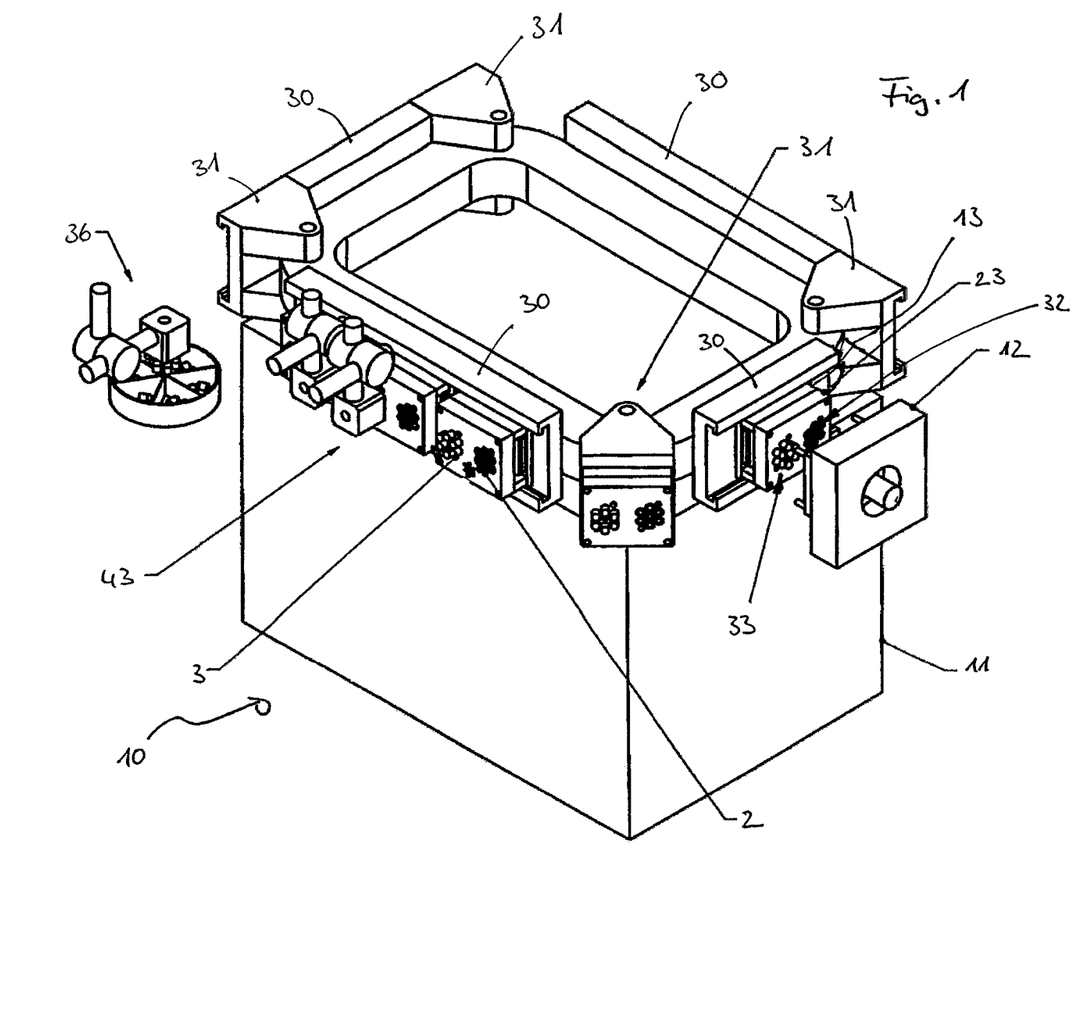
FIG. 1 shows a perspective view of an injection molding and assembly apparatus according to an exemplary embodiment of the present invention.

FIG. 1 shows a perspective view of an injection molding and assembly apparatus according to an exemplary embodiment of the present invention. As can be taken from the Figure, the steps of the method of molding and assembling a plurality of two different molded parts are shown in detail.

The injection molding and assembly apparatus 10 comprises a machine base 11 which supports the devices of the apparatus 10.

The apparatus 10 comprises a first machine platen 12 and a second machine platen 13 at which a second mold plate 23 is arranged in FIG. 1. At the first machine platen 12 a first mold plate 22 is mounted. The second mold plate 23 comprises at least a portion of a plurality of first mold cavities 33 of type A and at least a portion of a plurality of mold cavities 32 of type B. The second mold plate 23 is aligned with the first mold plate 22 and the second mold plate 23 is laterally movable relative to the first mold plate 22 and outside the injection molding station.

The plurality of first mold cavities 33 of type A are configured to form a plurality of molded parts 3 of type A', and the plurality of mold cavities 32 of type B are configured to form a plurality of molded parts 2 of type B'. As can be seen better in FIGS. 5 and 6, the parts of type B' have a different structure relative to the molded parts of type A'.

The exemplary apparatus 10 further comprises a transferring mechanism with rails 30 and pivoting arrangements 31 to carry the second mold plate 23 including the molded parts of type A' and of type B' outside the injection molding station.

Figure 5:
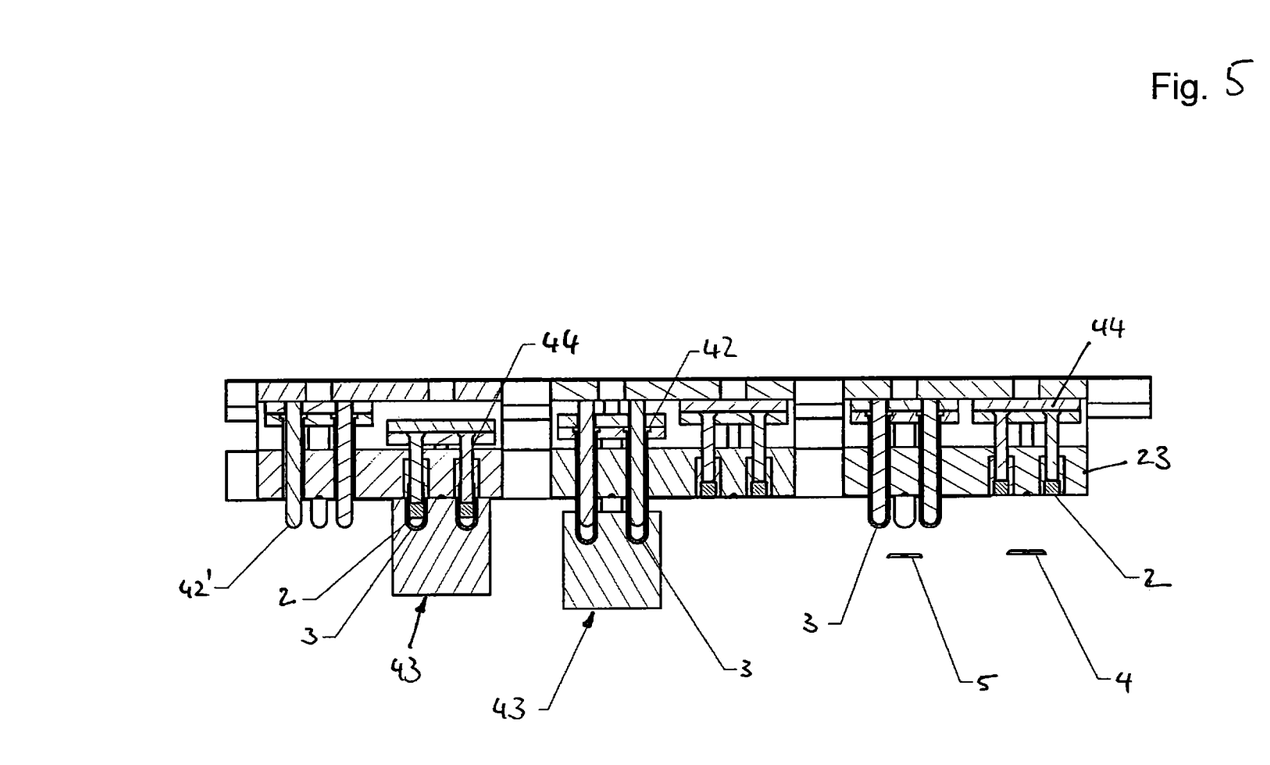
FIG. 5 shows a cross-sectional view of the devices of the apparatus shown in FIG. 4.

As can be seen in more detail in FIG. 5, the exemplary apparatus 10 further comprises a first device 42 to remove the molded parts 3 of type A' from the first mold cavities 33 of type A. A second device 43 is provided for receiving the molded parts 3 of type A' for positioning of the molded parts 3 of type A' in a predetermined position relative to the molded parts 2 of type B'. In one embodiment, this positioning could be performed by a robot arm. The exemplary apparatus 10 further comprises a removing and coupling device 44 to separate the molded parts 2 of type B' from the second mold plate 23 and to couple the molded parts 3, 2 of type A' and type B' to create an assembly 6 of molded parts of type A' and type B'. In the shown embodiment, the removing and coupling device 44 comprises removing elements, which on one hand eject the molded parts 2 from the cavity 32. By doing so, each removing element presses one molded part 3 of type A' into the cavity of one molded part 2 of type B', thereby coupling the molded part 3 of type A' to a molded part 2 of type B'. For this purpose, the molded part 2 of type B' is positioned in a suitable position in front of the cavity 32 by means of the second device 43. After the coupling of the molded parts 2, 3, the second device 43, moves the assembly of molded part 3 and molded part 2 out of the assembling position.

In the exemplary embodiment, the first device 42 to remove the molded parts 3 of type A' from the first mold cavities 33 uses the cores 42' of the first mold cavities 33 of type A. At the right side of FIG. 5 the removal of the sprue 4 of the molded parts 2 and the removal of the sprue 5 of the molded parts 3 is shown.

Figure 2:
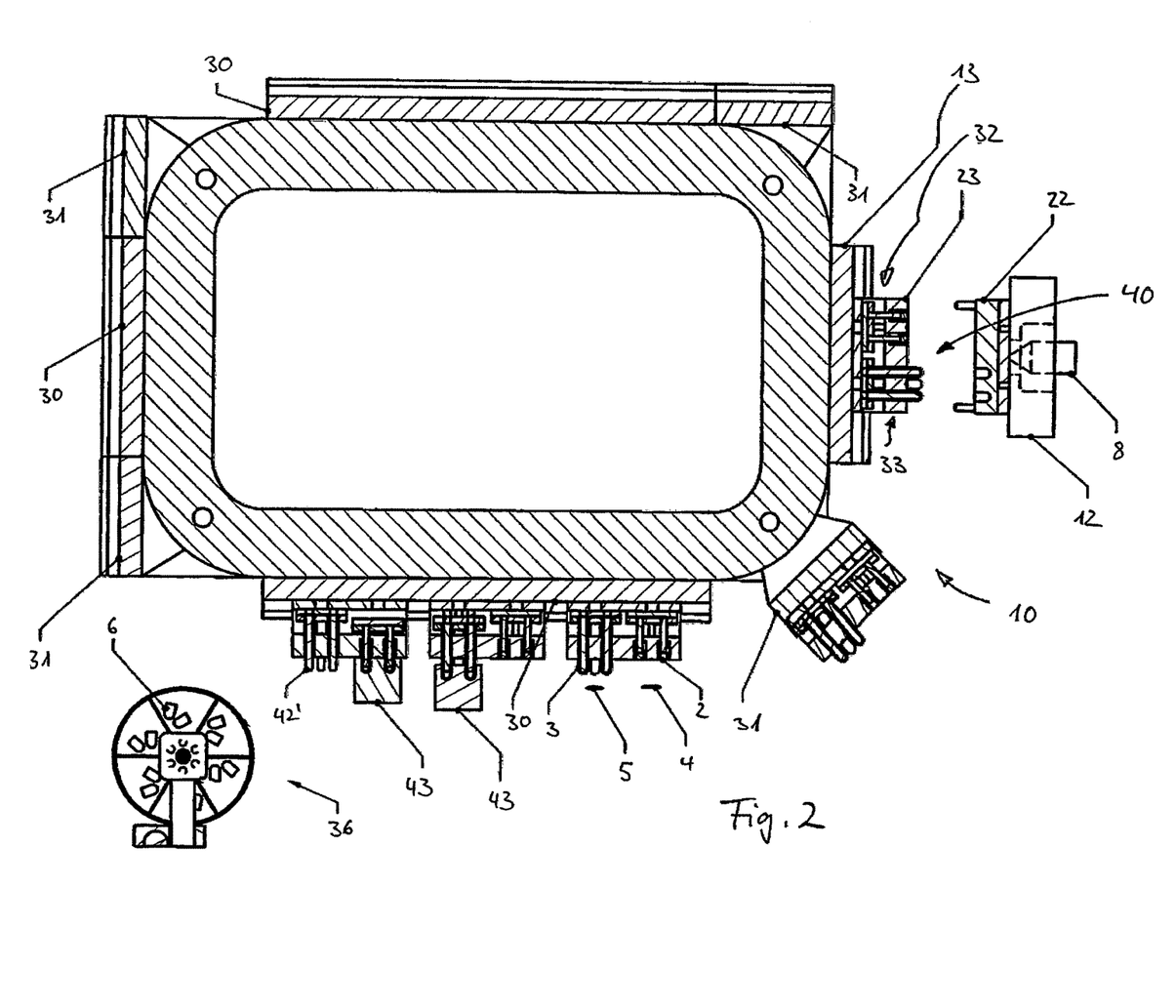
FIG. 2 shows a cross-sectional view of the exemplary injection molding and assembly apparatus of FIG. 1.

FIG. 2 shows a cross-sectional view of the exemplary injection molding and assembly apparatus of FIG. 1. Corresponding to FIG. 1, the injection molding and assembly apparatus 10 comprises a first machine platen 12 which is arranged at an injection unit 8 which comprises a hot runner system; and a second machine platen 13 at which a second mold plate 23 is arranged. At the first machine platen 12 a first mold plate 22 is mounted. The second mold plate 23 comprises at least a portion of a plurality of first mold cavities 33 of type A and at least a portion of a plurality of mold cavities 32 of type B. The second mold plate 23 is aligned with the first mold plate 22 and the second mold plate 23 is laterally movable relative to the first mold plate 22 and outside the injection molding station 40.

The exemplary apparatus 10 further comprises a transferring mechanism with rails 30 and pivoting arrangements 31 to carry the second mold plate 23 including the molded parts of type A' and of type B' outside the injection molding station. In FIG. 2 is also a magazine 36 shown, where the assembly 6 of molded parts 2, 3 is stored.

Figure 3:
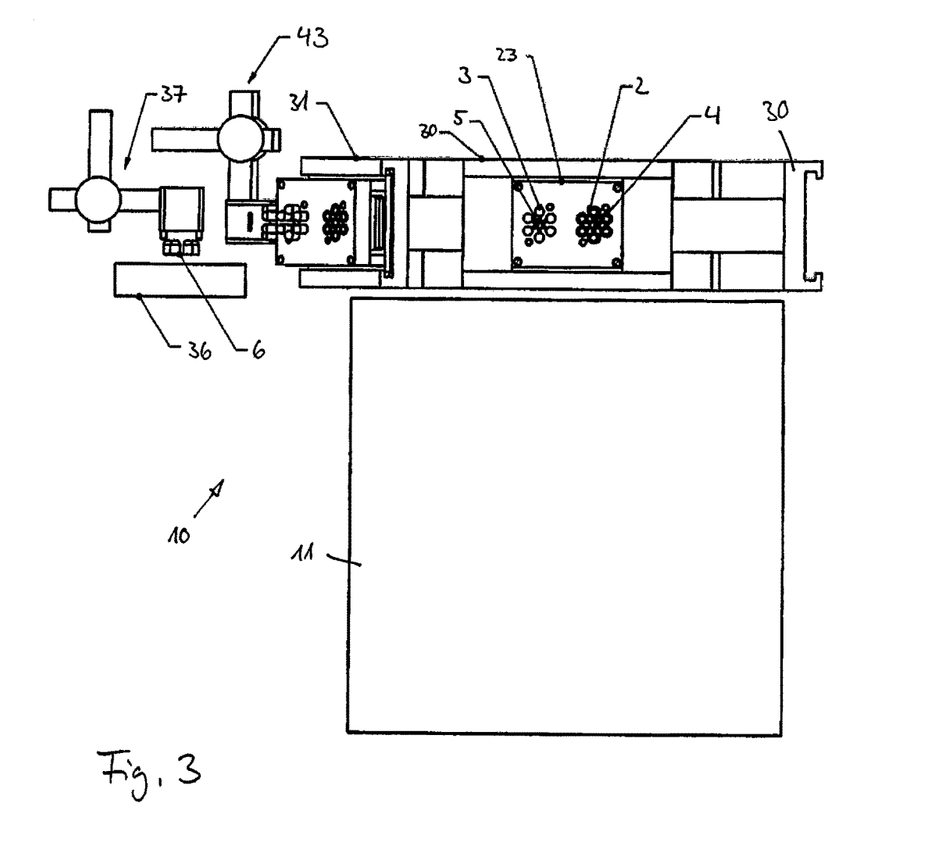
FIG. 3 shows a side view of the exemplary injection molding and assembly apparatus of FIG. 1.

FIG. 3 shows a side view of the exemplary injection molding and assembly apparatus of FIG. 1. The same elements are identified with same reference numerals as in the figures described before. In FIG. 3 the magazine 36 can be seen with a magazine-robot 37, which receives the assemblies 6 of molded parts 2, 3 to store them in the magazine 36. As can also be seen in FIG. 3, the a second device 43 to position the molded parts 3 of type A' in a predetermined position relative to the molded parts 2 of type B' comprises in this exemplary embodiment a robot arm for moving and positioning of the molded parts 2.

Figure 4:
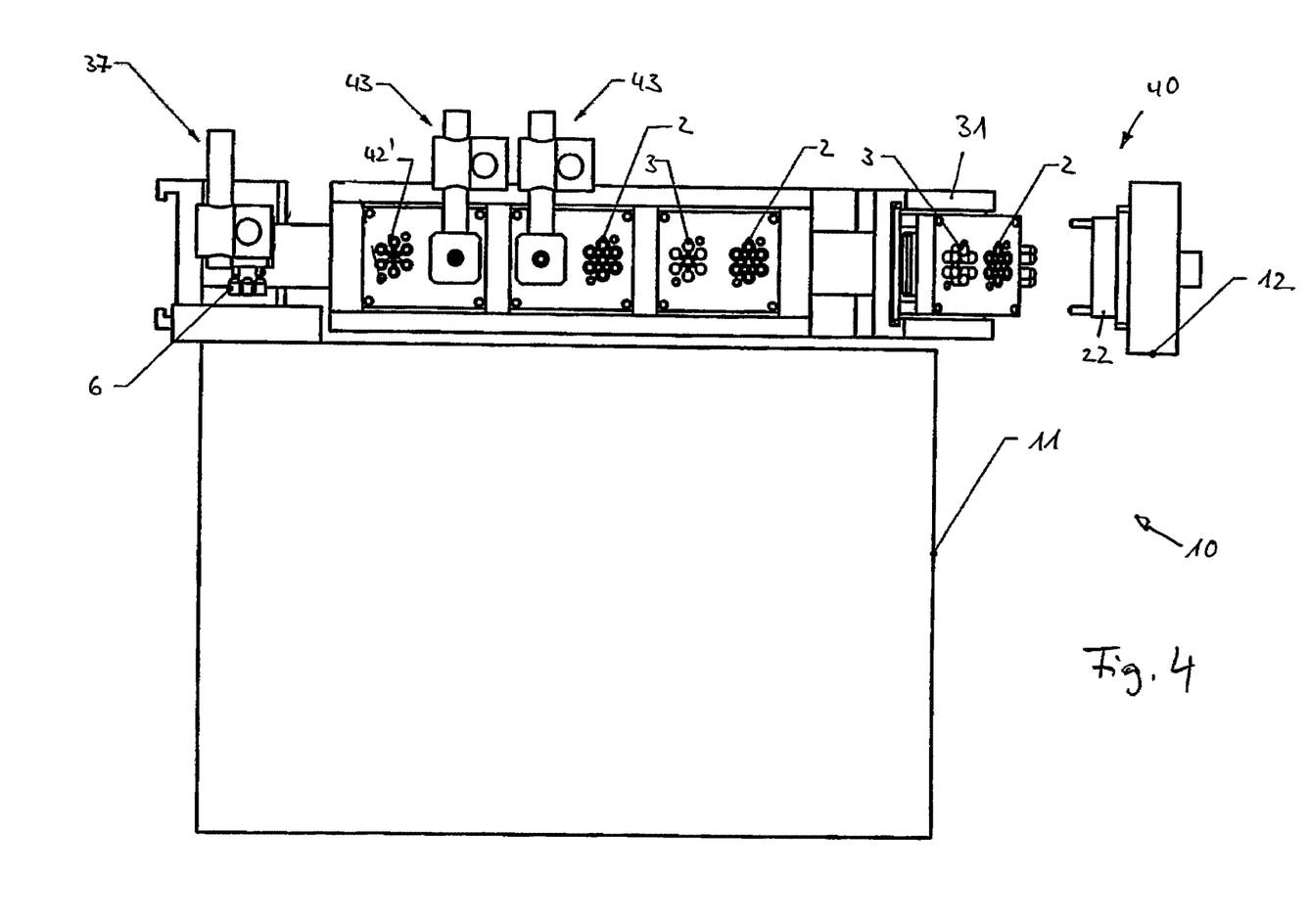
FIG. 4 shows a further side view of the exemplary injection molding and assembly apparatus of FIG. 1.

FIG. 4 shows a further side view of the exemplary injection molding and assembly apparatus 10 of FIG. 1. The same elements are identified with same reference numerals as in the figures described before.

Figure 6A:
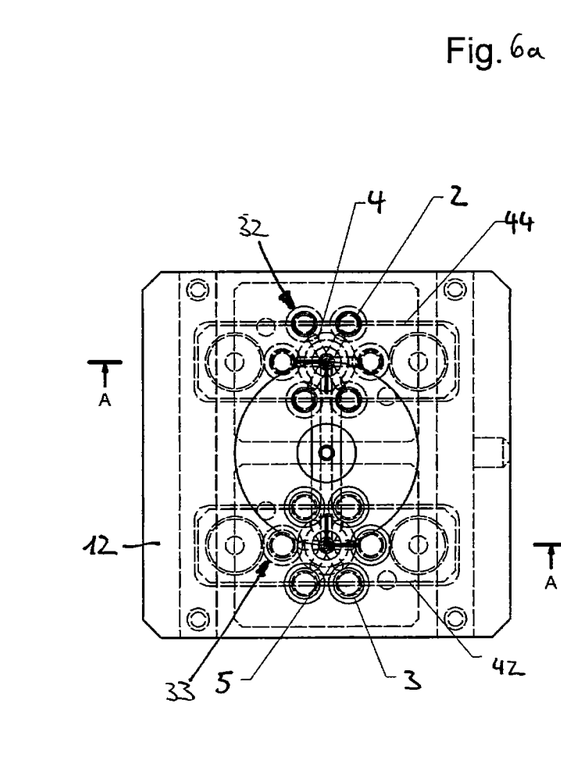
FIG. 6a shows a side view of an exemplary injection molding station from the first machine platen side.

FIG. 6a shows a side view of an exemplary injection molding station seen from the first machine platen side 12. The injection molding station 40 with the first machine platen 12 at the front is shown in a rotated position. The second cavities 32 are shown on the upper side and the first cavities 33 are shown on the lower side. Molded parts 2, 3 are disposed inside the cavities 32, 33. The sprue 4, 5, which is still connected to the molded parts 2, 3 can be seen respectively between the molded parts 2 and 3. The first device 42 to remove the molded parts 3 of type A' from the first mold cavities 33 and the removing and coupling device 44 to separate the molded parts 2 from the second mold plate 23 and to couple the molded parts 3, 2 of type A' and type B' to create an assembly 6 of molded parts of type A' and type B' are displayed in broken lines.

Figure 6B:
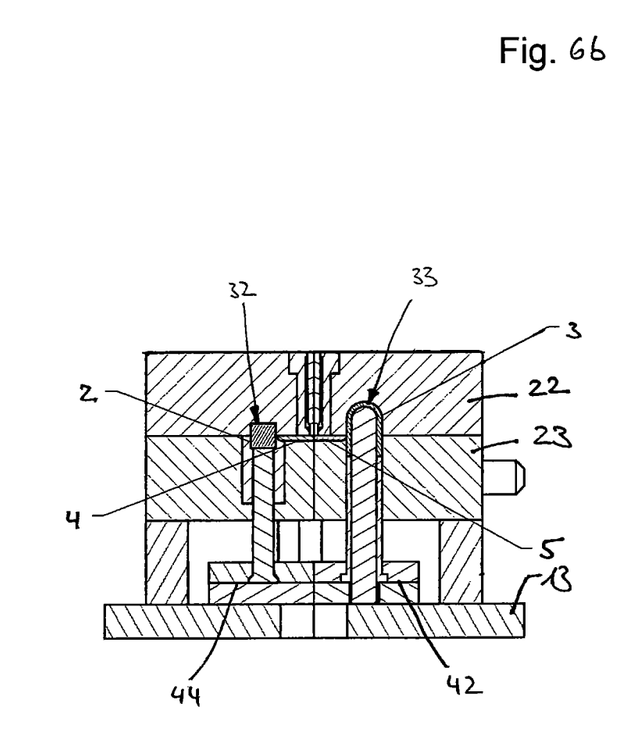
FIG. 6b shows a cross-sectional view of the exemplary injection molding station of FIG. 6a along sectional plane A-A.

FIG. 6b shows a cross-sectional view of the exemplary injection molding station of FIG. 6a along sectional plane A-A. Some elements described with respect to FIG. 6a, can be seen in more details in FIG. 6b. In particular the first device 42 to remove the molded parts 3 and the removing and coupling device 44 to separate the molded parts 2 from the second mold plate 23 and to couple the molded parts 3 to create an assembly 6 are shown in more detail in FIG. 6b.

Figure 7:
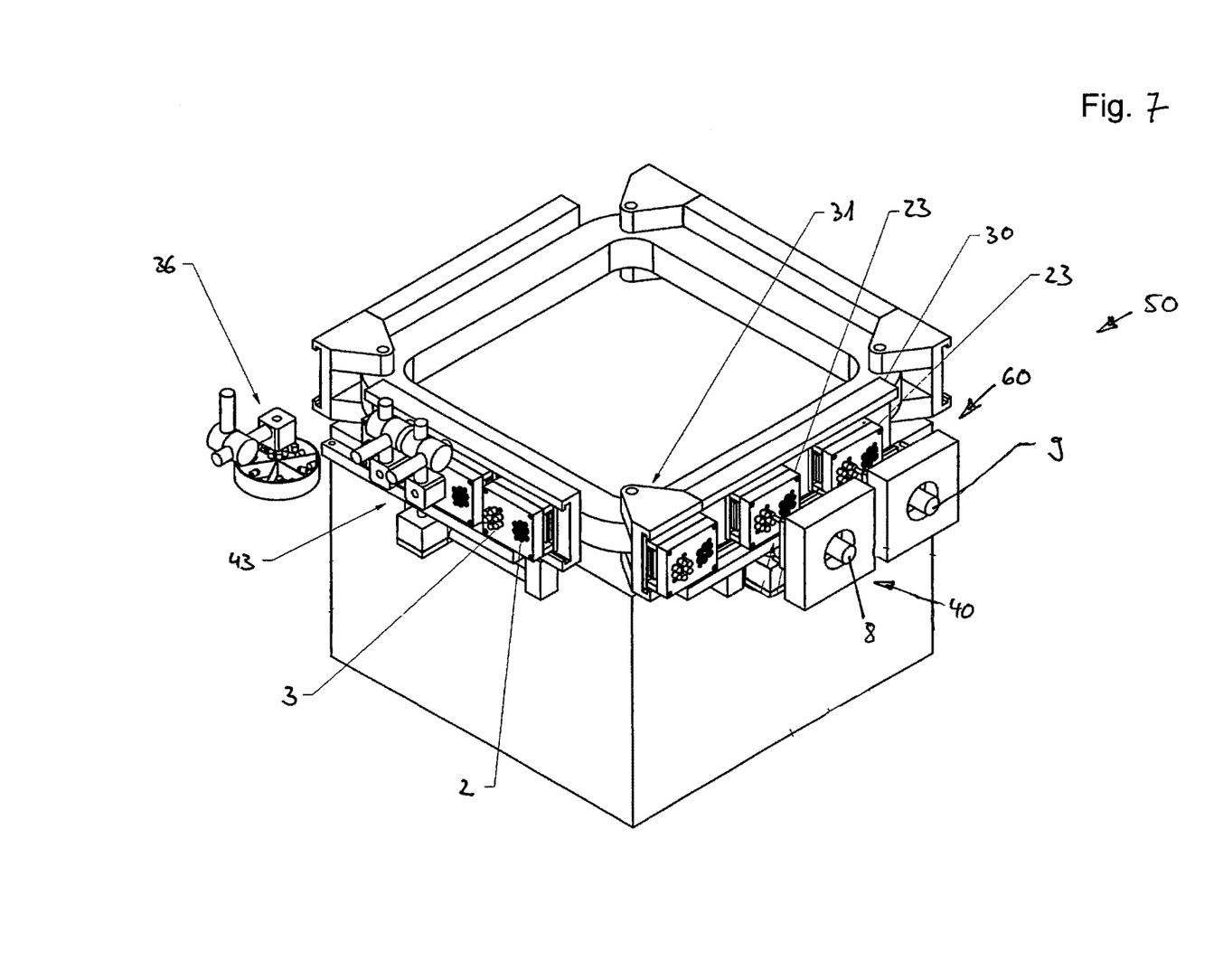
FIG. 7 shows a perspective view of a further injection molding and assembly apparatus according to a second exemplary embodiment of the present invention having two injection molding stations.

FIG. 7 shows a perspective view of a further injection molding and assembly apparatus according to a second exemplary embodiment of the present invention having two injection molding stations. The injection molding and assembly apparatus 50 shown in FIG. 7 differs from the injection molding and assembly apparatus 10 in a second injection unit 9, which is part of a second injection molding station 60. The second injection unit 9 can comprise a hot runner system or a cold runner system. In the exemplary embodiment, the apparatus 50 is one that comprises two injection molding stations 8, 9 comprising hot runner system. It is also possible that the second injection unit comprises a cold runner system, to establish a hybrid system.

Further elements of the second injection molding station 60 are substantially same as of the first injection molding station 40. In the exemplary embodiment, the second injection unit 9 provides a second melt to be injected in one of the cavities 2, 3. With using two different kinds of material for injection molding, an assembly 6 comprising two parts 2, 3 made from different materials is possible. The use of more than one injection units comprising either hot runner systems or hot and cold runner systems multiplies the number of assemblies that can be manufactured with an injection molding and assembly apparatus 50.

Figure 8:
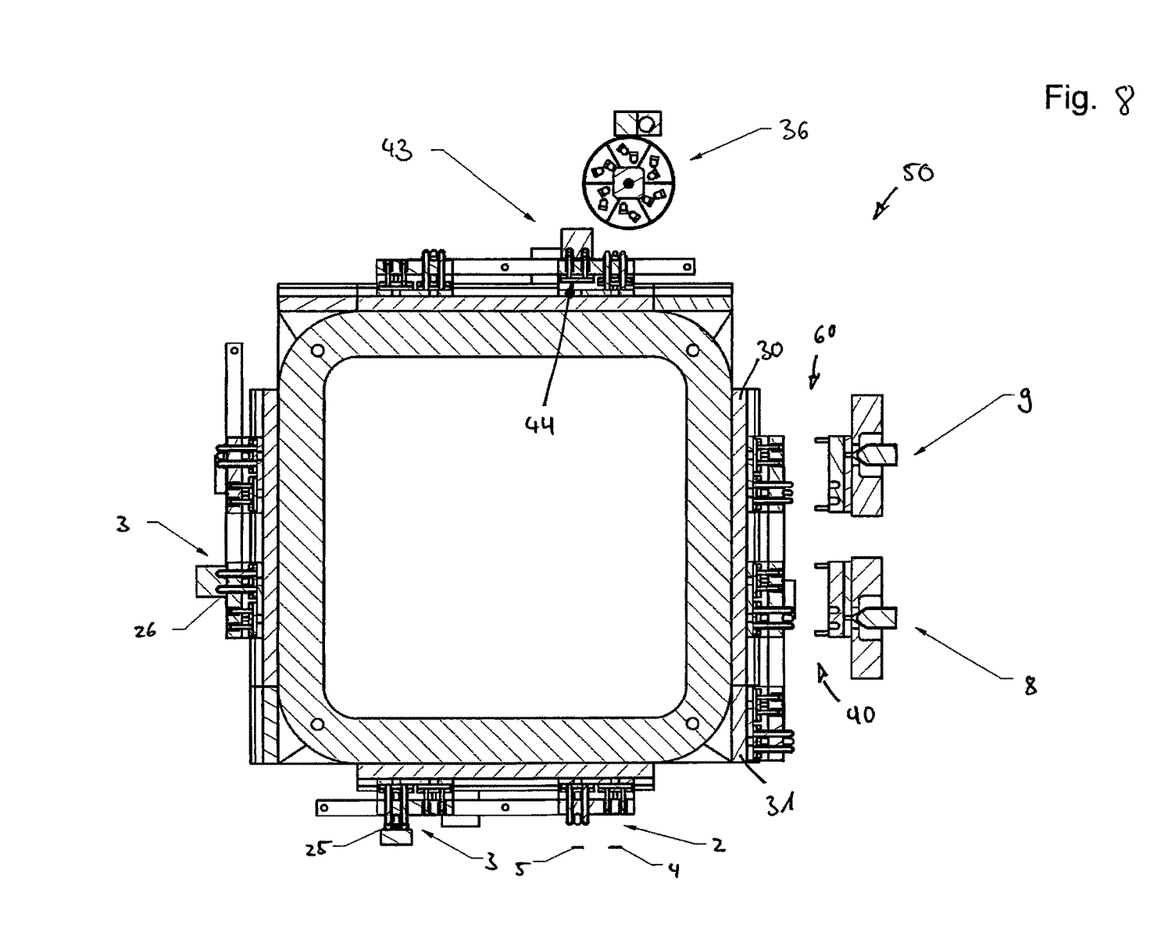
FIG. 8 shows a cross-sectional view of the exemplary injection molding and assembly apparatus of FIG. 7.

FIG. 8 shows a cross-sectional view of the exemplary injection molding and assembly apparatus 50 of FIG. 7. Additionally to FIG. 7, there are farther stations 25, 26 arranged at the apparatus 50. For example, a tempering device 25 is arranged at the lower side of the apparatus 50 in FIG. 8 and a coating device 26 is arranged at the left side of the apparatus 50 in FIG. 8.

Figure 9:
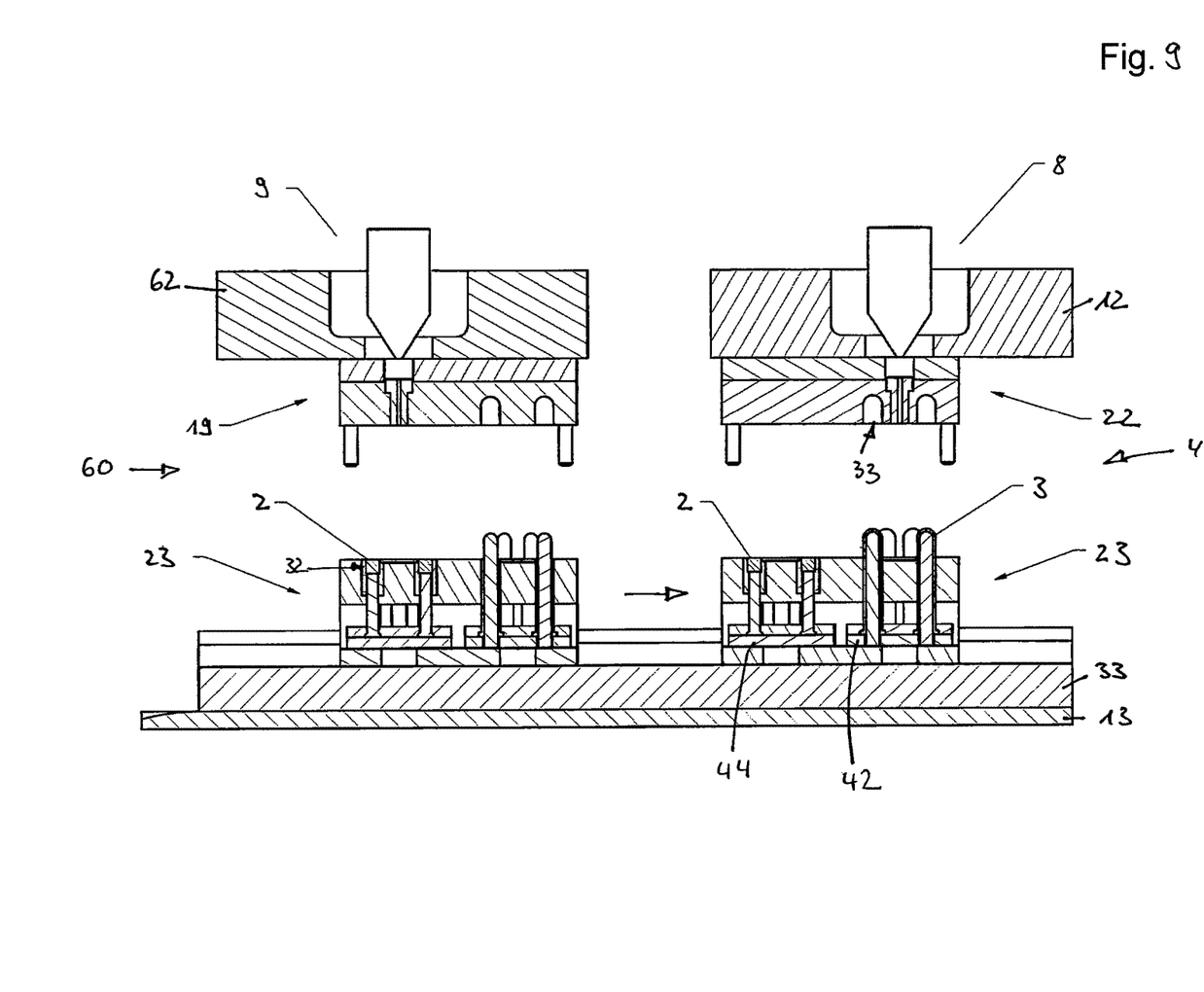
FIG. 9 shows a cross-sectional view of both exemplary injection molding stations of the exemplary injection molding and assembly apparatus of FIG. 7.

FIG. 9 shows a cross-sectional view of both exemplary injection molding stations 40, 60 of the exemplary injection molding and assembly apparatus of FIG. 7. The apparatus 50 comprises two first machine platens 12, 62 and a second machine platen 13 at which two second mold plates 23 are arranged in FIG. 9. At the first machine platens 12, 62 respective first mold plates 19, 22 are mounted. The second mold plates are moveable laterally as indicated by the arrow.

The first mold plate 22 comprises a portion of a plurality of first mold cavities 33. The other first mold plate 19 does not comprise a portion of mold cavities, but recesses 33' for receiving the mold cores 42'. The second mold plate 23 comprises at least a portion of a plurality of first mold cavities 33 of type A and the whole volume of the plurality of mold cavities 32 of type B. For the first injection step, the second mold plate 23 is positioned aligned with the first mold plate 19 and for the second injection step, the second mold plate 23 is positioned aligned with the first mold plate 22. After an injection step is completed, the second mold plate 23 is laterally moved relative to the first mold plates 19, 22 outside the injection molding stations 60, 40.

Figure 10:
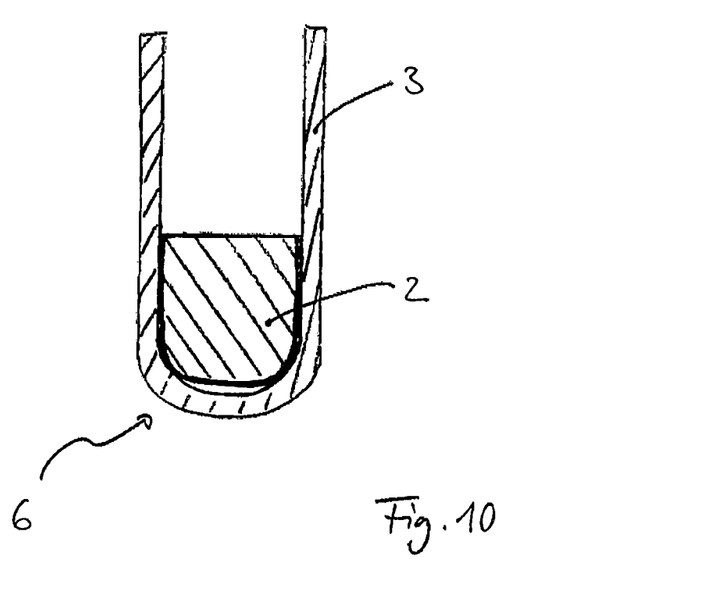
FIG. 10 shows a cross-sectional view of an assembly of molded parts of type A' and type B'.
Figure 11A:
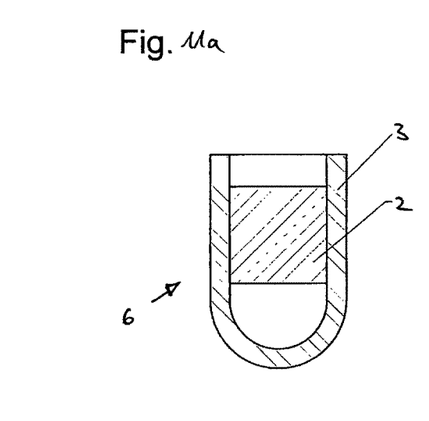
FIGS. 11a-11e show further cross-sectional views of exemplary assemblies of molded parts of type A' and type B'.
Figure 11B:
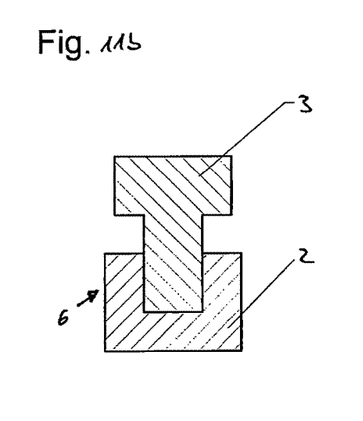
Figure 11C:
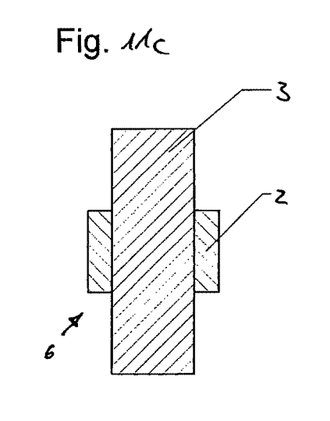
Figure 11D:
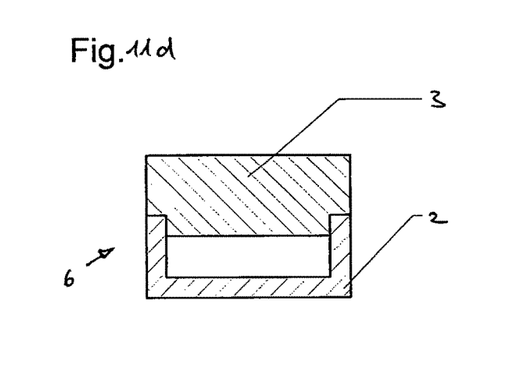
Figure 11E:
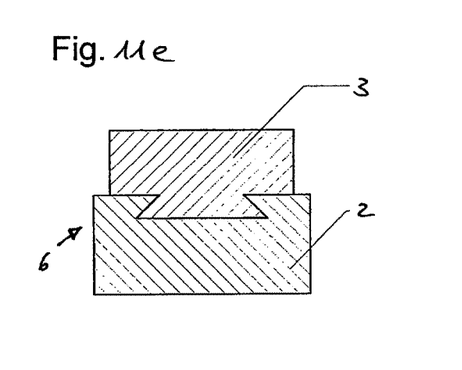

FIG. 10 shows a cross-sectional view of an assembly of molded parts of type A' and type B'. FIG. 10 shows the assembly 6 after the removing and coupling device 44 which separated the molded part 2 of type B' from the second mold plate 23 and coupled the molded parts 2 to the molded part 3 of type A'. Thus, the removing and coupling device 44 created the assembly 6 of a molded part 3 of type A' and a molded part 2 of the type B'.

FIGS. 11a-11e show further cross-sectional views of exemplary assemblies 6 of molded parts 2, 3 of type A' and type B'. Every of the shown assemblies 6 can be made up of two parts 2, 3 made from the same material or of two parts 2, 3 which are made from two different materials by use of a second injection unit.

The invention claimed is:

1. An injection molding and assembly apparatus comprising:
  a first injection unit to provide a first molten material comprising a hot runner system;
  a first machine platen and a second machine platen;
  a first injection molding station defined between the first machine platen and the second machine platen;
  a first mold plate and
  a second mold plate, the second mold plate comprising at least a portion of a plurality of first mold cavities of type A and at least a portion of a plurality of mold cavities of type B,
    wherein the second mold plate is laterally movable relative to the first mold plate and outside the injection molding station
    wherein the plurality of first mold cavities of type A are configured to form a plurality of molded parts of type A', and wherein the plurality of mold cavities of type B are configured to form a plurality of molded parts of type B' that have a different structure relative to the molded parts of type A';

a transferring mechanism to carry the second mold plate including the molded parts of type A' and of type B' outside the injection molding station;

a tempering device located at a tempering station to temper the molded parts of type A' and type B';

a first device located at a removing and coupling station to remove the molded parts of type A' from the second mold plate;

a second device located at the removing and coupling station to position the molded parts of type A' in a predetermined position relative to the molded parts of type B'; and a removing and coupling device located at the removing and coupling station to separate the molded parts of type B' from the second mold plate and to couple the molded parts of type A' and type B' to create an assembly of molded parts of type A' and type B', wherein the transferring mechanism is configured to carry the second mold plate to the tempering station after the first injection unit has provided the first molten material to the plurality of mold cavities of type A and B; and wherein the transferring mechanism is configured to carry the second mold plate to the removing and coupling station after the tempering device has tempered the plurality of molded parts of type A' and the plurality of molded parts of type B'.

2. An injection molding and assembly apparatus according to claim 1, characterized in that the plurality of mold cavities of type B is a plurality of second mold cavities of type B.

3. An injection molding and assembly apparatus according to claim 1, further including a second injection unit to inject a second molten material.

4. An injection molding and assembly apparatus according to claim 3, further comprising:
an additional first machine platen;
a second injection molding station defined between the additional first machine platen and the second machine platen; and
an additional first mold plate;
wherein the transferring mechanism is configured to carry the second mold plate to the second injection molding station after the first injection unit has provided the first molten material to the plurality of mold cavities of type A and B, and
wherein the transferring mechanism is configured to carry the second mold plate to the tempering station after the second injection unit has provided the second molten material to the plurality of mold cavities of type A.

5. An injection molding and assembly apparatus according to claim 3, further comprising:
an additional first machine platen;
a second injection molding station defined between the additional first machine platen and the second machine platen; and
an additional first mold plate;
wherein the transferring mechanism is configured to carry the second mold plate to the second injection molding station after the first injection unit has provided the first molten material to the plurality of mold cavities of type A and B, and
wherein the transferring mechanism is configured to carry the second mold plate to the tempering station after the second injection unit has provided the second molten material to the plurality of mold cavities of type B.

6. An injection molding and assembly apparatus according to claim 1, wherein the first mold plate comprising at least a further portion of the plurality of the mold cavities of type A and at least a further portion of the plurality of mold cavities of type B, so as to complete the mold cavities of type A and the mold cavities of type B.

7. An injection molding and assembly apparatus according to claim 1, wherein the second mold plate comprises the entire mold cavities of type A and the entire mold cavities of type B.

8. An injection molding and assembly apparatus according to claim 1, wherein the structure of the molded parts of type A' and the molded parts of type B' differ in at least one of shape, size, weight, length, smell, depth, origin, look, volume, color, chemical composition.

9. An injection molding and assembly apparatus according to claim 1, wherein the removing and coupling device is configured to couple the molded parts of type A' and the molded parts of type B' in pairs such that a molded part of type A' coming from a specific one of the plurality of the mold cavities of type A is always coupled to a molded part of type B' coming from one and the same of the plurality of the mold cavities of type B.

10. An injection molding and assembly apparatus according to claim 1, wherein the removing and coupling device is provided as an integral device or is provided as two separate devices.

11. An injection molding and assembly apparatus according to claim 1, wherein molded part of type A' is a component comprising a cavity, and molded part of type B' is a component having a shape which is configured to be introduced into the cavity of molded part of type A'.

12. An injection molding and assembly apparatus according to claim 1, wherein the transferring mechanism is configured to carry the second mold plate to the first injection molding station after the first device has removed the plurality of molded parts of type A' and the removing and coupling device has removed the plurality of molded parts of type B' from the second mold plate.

13. An injection molding and assembly apparatus according to claim 1, further comprising a magazine-robot located at the removing and coupling station to receive the assemblies of molded parts and transfer them to a magazine.

14. An injection molding and assembly apparatus according to claim 1, further comprising a coating device located at a coating station to coat the molded parts;
wherein the transferring mechanism is configured to carry the second mold plate to the coating station after the tempering device has tempered the plurality of molded parts of type A' and the plurality of molded parts of type B', and
wherein the transferring mechanism is configured to carry the second mold plate to the removing and coupling station after the coating device has coated the plurality of molded parts of type A' and the plurality of molded parts of type B'.

15. An injection molding and assembly apparatus comprising:
at least a first mold plate and a second mold plate, comprising a plurality of mold cavities of type A, configured to form a plurality of molded parts of type A', and a plurality of mold cavities of type B, configured to form a plurality of molded parts of type B' that have a different structure relative to the molded parts of type A';

a transferring mechanism to carry the second mold plate including molded parts of type A' and of type B' to a predetermined position;

a first device to remove the molded parts of type A' from the mold cavities of type A;

a second device to position the molded parts of type A' in a predetermined position relative to the molded parts of type B';

a removing and coupling device to separate the molded parts of type B' from the second mold plate and to couple the molded parts of type A' and type B' to create an assembly of molded parts of type A' and type B'; and a magazine-robot to receive the assemblies of molded parts and transfer them to a magazine.

\* \* \* \* \*